United States Patent
Park

(10) Patent No.: US 7,362,291 B2
(45) Date of Patent: Apr. 22, 2008

(54) LIQUID CRYSTAL DISPLAY DEVICE

(75) Inventor: Hyong Yerl Park, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 210 days.

(21) Appl. No.: 10/319,707

(22) Filed: Dec. 16, 2002

(65) Prior Publication Data

US 2003/0117359 A1 Jun. 26, 2003

(30) Foreign Application Priority Data

Dec. 26, 2001 (KR) ............... 10-2001-0085330

(51) Int. Cl.
*G09G 3/36* (2006.01)

(52) U.S. Cl. ............... 345/87; 345/89; 345/98; 345/100; 345/103; 345/204; 349/148; 349/149; 349/150; 349/151; 349/152

(58) Field of Classification Search ............... 345/80, 345/87, 90–100, 103, 204–206, 89; 349/148–151; 315/169.3
See application file for complete search history.

(56) References Cited

U.S. PATENT DOCUMENTS 5,691,787 A * 11/1997 Shimada et al. ............... 349/40
6,411,353 B1 * 6/2002 Yarita et al. ............... 349/59
6,522,319 B1 * 2/2003 Yamazaki ............... 345/103
6,697,041 B1 * 2/2004 Tamai et al. ............... 345/100
2001/0026250 A1 * 10/2001 Inoue et al.
2001/0040543 A1 * 11/2001 Lee
2002/0109534 A1 * 8/2002 Schrodinger

FOREIGN PATENT DOCUMENTS

| KR | 2 343 541 A | * | 5/2000 |
| KR | 10-2001-0006164 | | 1/2001 |
| WO | WO 9940561 | | 8/1999 |

* cited by examiner

*Primary Examiner*—Richard Hjerpe
*Assistant Examiner*—Jennifer T Nguyen
(74) *Attorney, Agent, or Firm*—McKenna, Long & Aldridge LLP

(57) ABSTRACT

A liquid crystal display device includes a controller arranged on a data printed circuit board for receiving externally generated video data and clock signals and a resistor for removing electromagnetic noise generated at the controller. Electromagnetic noise such as ESD, interference from other signals, etc., which might be transmitted to a gate driver IC through a resistor formed on a data printed circuit board can be eliminated using a ground voltage and picture quality can be thereby be improved.

14 Claims, 3 Drawing Sheets

LIQUID CRYSTAL DISPLAY DEVICE

This application claims the benefit of Korean Patent Application No. P2001-85330, filed on Dec. 26, 2001, which is hereby incorporated by reference for all purposes as if fully set forth herein.

BACKGROUND OF THE INVENTION

1. Field of the Invention

The present invention relates to liquid crystal displays, and more particularly to a liquid crystal display capable of improving a picture quality.

2. Discussion of the Related Art

Generally, pictures are displayed by liquid crystal displays (LCDs) by receiving video data signals and selectively controlling light transmittance characteristics of liquid crystal cells arranged in a matrix pattern within a liquid crystal display panel. Owing to their light weight, minimized thickness, and low power consumption, LCDs are finding uses in an increasing number of applications. Particularly, chip-on-glass (COG) type LCDs include LSI driver integrated circuits (ICs) mounted on liquid crystal display panels. Electrical conductors used to apply signals to driver ICs of COG-type LCDs are fabricated directly on a lower glass substrate using a line-on-glass (LOG) technique.

FIG. 1 illustrates a schematic view of a COG-type LCD fabricated using an LOG technique.

Referring to FIG. 1, an LCD includes a liquid crystal display panel 2 having a plurality of pixels are arranged in a matrix pattern, a plurality of data driver ICs 8 for supplying data signals to a plurality of data lines DL arranged in the liquid crystal display panel 2, and a plurality of gate driver ICs 12 for supplying gate signals to a plurality of gate lines GL also arranged in the liquid crystal display panel 2.

The liquid crystal display panel 2 further includes lower and upper glass substrates 1a and 1b, respectively, connected to and separated from each other by a layer of liquid crystal material (not shown). The plurality of gate and data lines are formed on the lower glass substrate 1a so as to cross each other. Referring to FIG. 2, a plurality of thin film transistors (TFTs) are formed where the gate and data lines cross each other and selectively supply the video data signals applied to the data lines DL to the liquid crystal cells Clc. Accordingly, gate terminals of each of the TFTs are connected to a corresponding gate line GL, source terminals of each of the TFTs are connected to a corresponding one of the data lines DL, and drain electrodes of each of the TFTs are connected to a corresponding pixel electrode within the liquid crystal cell Clc.

Referring back to FIG. 1, the plurality of data driver ICs 8 are mounted on a plurality of data tape carrier packages (TCPs) 10 and electrically connect the plurality of data lines DL on the liquid crystal display panel 2 to a data printed circuit board (PCB) 6. A controller 18 is formed on the data PCB 6 and controls a power supplier (not shown) in addition to the data and gate driver ICs 8 and 12. The controller 18 controls a driving timing of the data and gate driver ICs 8 and 12 and supplies video data signals to the plurality of data driver ICs 8. The power supplier generates driving voltages (e.g., common voltage (Vcom), gate high voltage (Vgh), gate low voltage (Vgl), etc.) necessary for driving the liquid crystal display.

Dot clock signals (Dclk) and video data signals (e.g., red R, green G, blue B video data signals) are inputted from the controller 18 to the plurality of data driver ICs 8. The plurality of data driver ICs 8 latch the video data signals in synchrony with the dot clock signal (Dclk). The latched video data signals are adjusted in accordance with a gamma voltage. The plurality of data driver ICs 8 convert the adjusted video data signals to analog data signals and selectively apply the analog data signals to the plurality of data lines DL.

The plurality of gate driver ICs 12 are mounted on a plurality of gate TCPs 14 and electrically connect the plurality of the gate lines GL to a gate PCB 4. Each of the plurality of gate driver ICs 12 includes a shift register (not shown) for generating scanning pulses in response to gate start pulses (GSP) inputted from the controller 18 and a level shifter (not shown) for shifting a voltage of the scanning pulses to a level suitable for driving each of the liquid crystal cells within the liquid crystal display panel. Accordingly, each of the TFTs responds to the scanning pulses applied to the plurality of gate lines GL by applying the analog data signals to corresponding pixel electrodes of liquid crystal cells Clcs.

Referring to FIG. 3, gate signals necessary for driving the plurality of gate driver ICs 12 included within COG-type LCDs are applied to the gate PCB 4 via the data PCB 6, the data TCP 10, a line resistor 16, and a gate TCP 14. The line resistor 16 is formed on the liquid crystal display panel 2 and has a resistance value of about 100Ω. As the LCD is a COG-type device, gate signals supplied through the line resistor 16 are transmitted to each of the gate driver ICs 12 via the gate PCB 4 without the use of any flexible printed circuit (FPC).

Due to the presence of the line resistor 16, a voltage value of the gate signals reaching the gate driver ICs 12 must be compensated for and increased by a magnitude of ten to several hundreds of times greater than that required by gate signals transmitted through the FPC. Since the controller 18 cannot eliminate any externally generated electromagnetic noise (e.g., electrostatic discharges (ESD), interference by other signals, etc.), gate signals inputted to the gate driver ICs 12 by the controller may be distorted. Accordingly, a picture quality generated by the COG-type LCD may be deteriorated.

SUMMARY OF THE INVENTION

Accordingly, the present invention is directed to a liquid crystal display that substantially obviates one or more of the problems due to limitations and disadvantages of the related art.

An advantage of the present invention provides a liquid crystal display capable of improving a picture quality.

Another advantage of the present invention provides a liquid crystal display includes a controller arranged on a data printed circuit board for receiving externally generated video data and dot clock signals and a resistor for removing electromagnetic noise.

In one aspect of the present invention, the resistor may include at least one resistor arranged between a ground voltage and an output line of the controller.

In another aspect of the present invention, the resistor may have a resistance value of about 30-50Ω.

In yet another aspect of the present invention, the line resistor is formed at a non-display area of the liquid crystal display panel.

In still another aspect of the present invention, the liquid crystal display may include a data driver for applying a data signal generated by the controller, a gate driver for applying a gate signal generated by the controller, and a liquid crystal display panel having data lines connected to the data driver and gate lines connected to the gate driver and crossing the data lines at corresponding pixel areas.

In an additional aspect of the present invention, the data driver may be mounted on a data tape carrier package, the gate driver may be mounted on a gate tape carrier package, and a gate printed circuit board may be connected to the gate tape carrier package.

In one aspect of the present invention, the controller may generate and supply a gate signal to the gate driver via the data tape carrier package, the line resistor, and the gate tape carrier package.

In another aspect of the present invention, the output line of the controller may be arranged between at least one of an output line of a gate start pulse GSP, a gate shift clock GSC, and a gate output enable GOE signal.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 4:
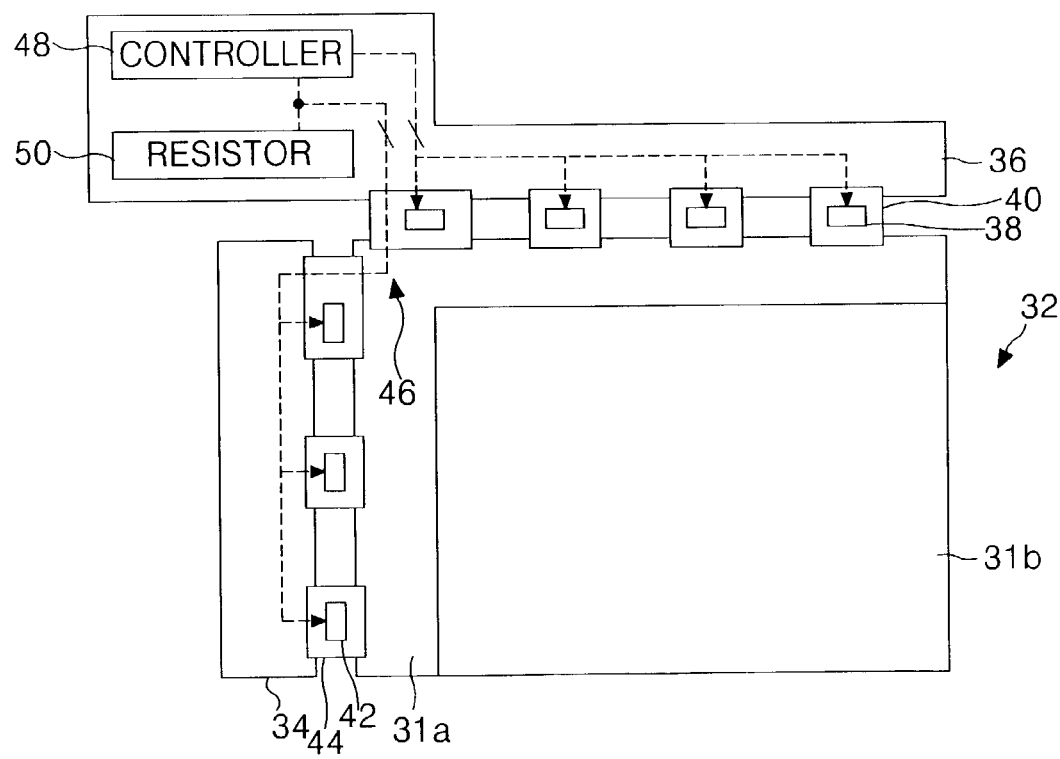
FIG. 4 illustrates a schematic view of a liquid crystal display according to one aspect of the present invention.

Referring to FIG. 4, a liquid crystal display according to one aspect of the present invention may, for example, include a liquid crystal display panel 32 having pixels arranged in a matrix pattern, a plurality of data driver ICs 38 for supplying data signals to a plurality of data lines (not shown) arranged on the liquid crystal display panel 32, a plurality of gate driver ICs 42 for supplying gate signals to a plurality of gate lines (not shown) arranged on the liquid crystal display panel 32, a controller 48, a resistor 50, and a data PCB 36 supporting the controller 48 and resistor 50.

Figure 1:
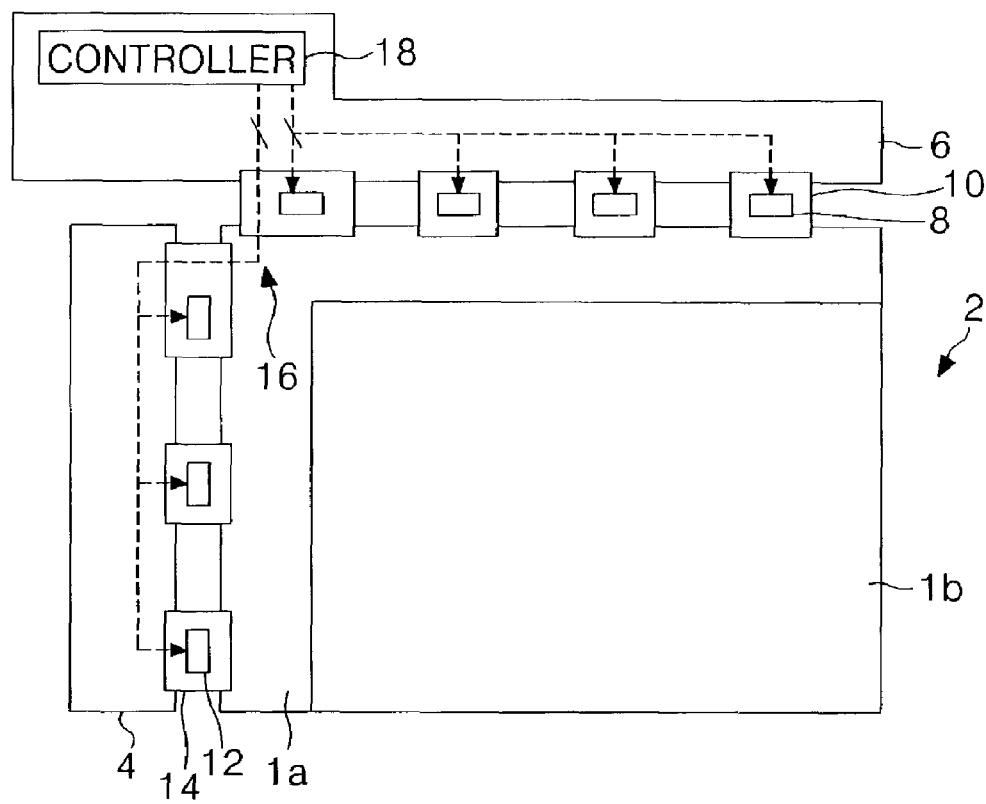
FIG. 1 illustrates a schematic view of COG-type liquid crystal display.
Figure 2:
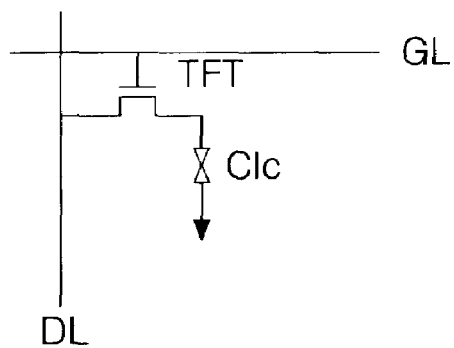
FIG. 2 illustrates a circuit diagram of a liquid crystal display panel within the liquid crystal display shown in FIG. 1.
Figure 3:
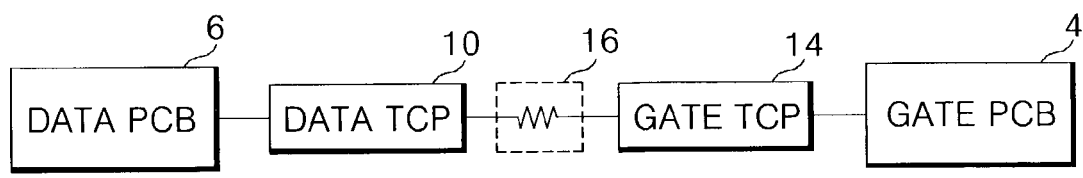
FIG. 3 illustrates a transmission path of gate control signals that are generated by the controller shown in FIG. 1.

Referring to FIG. 4, the liquid crystal panel 32 may include lower and upper glass substrates 31a and 31b, respectively, connected to and separated from each other by a layer of liquid crystal material (not shown). The plurality of gate and data lines may be formed on the lower glass substrate 31a so as to cross each other (e.g., perpendicularly). A plurality of TFTs, similar to those shown in FIG. 2, may be formed where the gate and data lines cross each other and selectively supply the video data signals applied to the data lines to the liquid crystal cells Clc. Accordingly, gate terminals of each of the TFTs are connected to a corresponding gate line, source terminals of each of the TFTs are connected to a corresponding one of the data lines, and drain electrodes of each of the TFTs are connected to a corresponding pixel electrode within the liquid crystal cell Clc.

Dot clock signals (Dclk) and video data signals (e.g., red R, green G, blue B video data signals) may be inputted from the controller 48 to the plurality of data driver ICs 38. The plurality of data driver ICs 38 latch the video data signals in synchrony with the dot clock signals (Dclk). The latched video signals are adjusted in accordance with a gamma voltage. The plurality of data driver ICs 38 convert the adjusted data signals into analog data signals and selectively apply the analog data signals to the plurality of data lines.

The plurality of data driver ICs 38 are mounted on a plurality of tape carrier packages (TCPs) 40 and electrically connect the plurality of data lines to a data printed circuit board (PCB) 36. A resistor 50 and a controller 48 are arranged on the data PCB 36. The resistor 50 is provided for eliminating electromagnetic noise such as ESD, interference by other signals, etc., present at the data PCB 36. The controller 48 is provided for controlling a driving timing of the plurality of data and gate driver ICs 38 and 42, respectively, and supply video data signals to the plurality of data driver ICs 38. A power supplier (not shown), for generating various driving voltages (e.g., common (Vcom), gate high (Vgh), gate low (Vgl) voltages, etc.) used to drive the liquid crystal display, may also be arranged on the data PCB 36.

Figure 5:
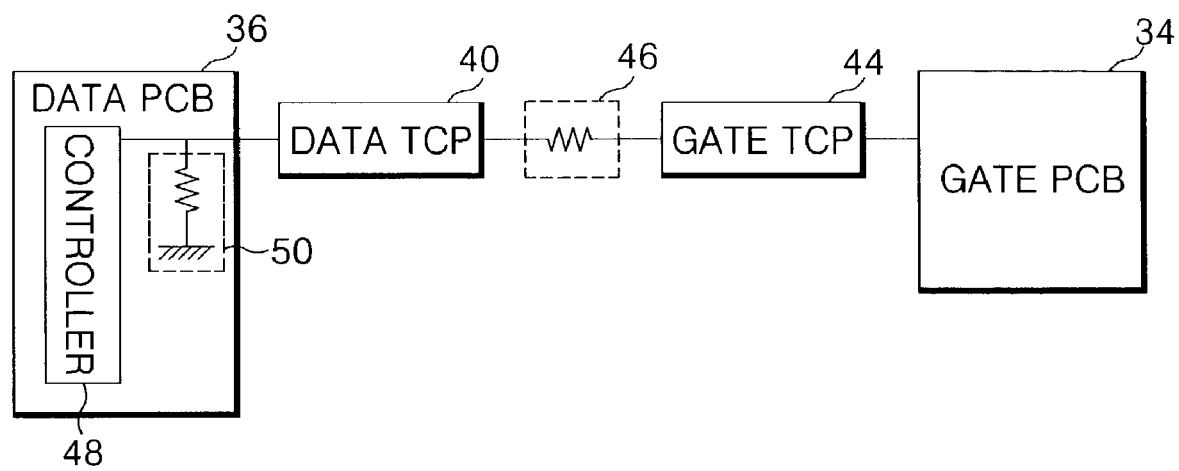
FIG. 5 illustrates a transmission path of gate control signals that are generated by a controller shown in FIG. 4.

Referring to FIGS. 4 and 5, in one aspect of the present invention, the resistor 50 may be formed in parallel between a ground voltage (GND) and a gate signal output line of the controller 48. The gate signals outputted from the output line of the controller 48 may be transmitted to the gate PCB 34 via the data PCB 36. In another aspect of the present invention, the resistor 50 may be provided as at least one resistor. Signals outputted by the controller 48 may, for example, include a supplying voltage (Vcc), a ground voltage (GND), a gate high voltage (Vgh), a gate low voltage (Vgl), a gate start pulse (GSP), a gate shift clock (GSC), a gate output enable (GOE), etc. Among the aforementioned signals outputted by the controller 38, the GSP, GSC, and GOE may be influenced by electromagnetic noise. Accordingly, the resistor 50 may be formed between output lines corresponding to each of the signals that may be influenced.

According to the principles of the present invention, the resistor 50 may be provided to have a resistance value between about 30-50Ω. When the resistor 50 has a resistance value between about 10-20Ω, the gate signals cannot be suitably outputted to the data PCB 36. Accordingly, the gate signals are removed by the ground voltage GND at the resistor 50 and are not displayed. When the resistor 50 has resistance value over about 60Ω, the LCD consumes an excessive amount of current.

Any electromagnetic noise generated at the resistor 50 is dissolved to the ground voltage GND connected to the resistor 50. Accordingly, gate signals, undistorted by electromagnetic noise, may be outputted to the gate PCB 34 via the data TCP 40, a line resistor 46, and a gate TCP 44.

The line resistor 46 may be formed on the liquid crystal panel 32 and have a resistance value of about 100Ω. As the LCD device illustrated in FIG. 4 is a COG-type device, the gate signals supplied through the line resistor 46 are transmitted, substantially undistorted by electromagnetic noise, to the plurality of gate driver ICs 42 via the gate PCB 34.

The plurality of gate driver ICs 42 may be mounted on a plurality of gate TCPs 44 and electrically connect the plurality of gate lines to the gate PCB 34. The gate signals required to drive the plurality of gate driver ICs 42 are generated at the controller 48. The gate signals generated by the controller 48 are substantially undistorted by any electromagnetic noise due to the presence of the resistor 50 arranged on the data PCB 36.

Each of the plurality of gate driver ICs 42 includes a shift register (not shown) for sequentially generating scanning pulses in response to the gate start pulse (GSP) transmitted by the gate PCB 34, and a level shifter (not shown) for shifting a voltage of the scanning pulses to a level suitable for driving each of the plurality of liquid crystal cells. Accordingly, each of the TFTs responds to the scanning pulses applied to the plurality of gate lines GL by applying the analog data signals to corresponding pixel electrodes of liquid crystal cells Clcs.

According to the principles of the present invention, a liquid crystal display may include a resistor arranged on a data PCB to eliminate electromagnetic noises present at the data PCB. Accordingly, gate signals generated by a controller arranged on the data PCB may be transmitted to driver ICs in a substantially undistorted form. Because gate signals are transmitted to driver ICs, a picture quality of the LCD may be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a liquid crystal display panel;
   a plurality of gate driver integrated circuits for driving a plurality of gate lines in response to gate signals;
   a plurality of data driver integrated circuits for driving a plurality of data lines in response to video data;
   a LOG line formed on a glass substrate of the liquid crystal display panel, wherein the LOG line connects any one of the data driver integrated circuits to any one of the gate driver integrated circuits;
   a controller for supplying the gate signals to the plurality of gate driver integrated circuits via an output line, and for supplying the video data to the plurality of data driver integrated circuits; and
   a first resistor connected directly to the output line, wherein the first resistor connects the output line to a ground voltage,
   wherein the output line includes at least one of an output line that supplies a gate start pulse (GSP) and an output line that supplies a gate shift clock (GSC),
   wherein a resistance of the first resistor is lower than that of the LOG line.

2. The liquid crystal display device according to claim 1, wherein gate signals applied to the plurality of gate driver integrated circuits are substantially undistorted by electromagnetic noise.

3. The liquid crystal display device according to claim 1, further comprising:
   a data printed circuit board, wherein signals capable for driving the plurality of data driver integrated circuits are transmitted through the data printed circuit board, and wherein the controller is arranged on the data printed circuit board.

4. The liquid crystal display device according to claim 3, wherein the first resistor is arranged on the printed circuit board.

5. The liquid crystal display device according to claim 1, further comprising:
   a gate printed circuit board;
   a plurality of gate tape carrier packages mounted on the gate printed circuit board;
   a plurality of data tape carrier packages;
   a liquid crystal panel; and
   a second resistor formed on the liquid crystal panel.

6. The liquid crystal display device according to claim 1, wherein the first resistor has a resistance value between about 30-50Ω.

7. A liquid crystal display device, comprising:
   a liquid crystal display panel;
   a plurality of data lines arranged on the liquid crystal display panel;
   a plurality of gate lines arranged on the liquid crystal display panel and crossing the plurality of data lines;
   a controller arranged on a data printed circuit board for receiving clock and video data signals;
   a data driver for applying a data signal generated by the controller to the plurality of data lines;
   a gate driver for applying a gate signal generated by the controller to the plurality of gate lines;
   a LOG line formed on a glass substrate of the liquid crystal display panel, wherein the LOG line connects the data driver to the gate driver integrated circuits; and
   a resistor for removing electromagnetic noise present at the controller, wherein the resistor comprises at least one resistor connected between a ground voltage and an output line of the controller,
   wherein the output line of the controller includes at least one of an output line that supplies a gate start pulse (GSP) and an output line that supplies a gate shift clock (GSC),
   wherein a resistance of the resistor is lower than that of the LOG line.

8. The liquid crystal display device according to claim 7, wherein the resistor has a resistance value between about 30-50Ω.

9. The liquid crystal display device according to claim 7, further comprising:
   a data tape carrier package, the data driver being mounted on the data tape carrier package;
   a gate tape carrier package, the gate driver being mounted on the gate tape carrier package; and
   a gate printed circuit board connected to the gate tape carrier package.

10. The liquid crystal display device according to claim 9, the controller capable of generating a gate signal receivable by the gate driver via the data tape carrier package, the LOG line, and the gate tape carrier package.

11. The liquid crystal display device according to claim 7, wherein the output line comprises an output line that supplies a gate start pulse GSP.

12. A method of operating a liquid crystal display device including a liquid crystal display panel, a LOG line formed on a glass substrate of the liquid crystal display pane, wherein the LOG line connects a data driver to a gate driver integrated circuits comprising:
- receiving clock and video data signals by a controller formed on a data printed circuit board;
- applying a data signal generated by the controller to a plurality of data lines;
- applying a gate signal generated by the controller to a plurality of gate lines;
- supplying at least one of a gate start pulse (GSP) and a gate shift clock (GSC) using an output line of the controller; and
- removing electromagnetic noise present at the controller, wherein the removing is performed by directly connecting resistor to the output line of the controller,
- wherein a resistance of the resistor directly connected to the output line of the controller is lower than that of the LOG line.

13. The method according to claim 12, further comprising arranging the resistor on the data printed circuit board.

14. The method according to claim 13, further comprising coupling the resistor to a ground voltage.

* * * * *